March 16, 1926.                                           1,576,648
J. A. GAGNON
STEAM TRAP
Filed June 18, 1923                    2 Sheets-Sheet 1

Inventor
Joseph A. Gagnon
By William Clinton
Attorney

March 16, 1926.
J. A. GAGNON
1,576,648
STEAM TRAP
Filed June 18, 1923
2 Sheets-Sheet 2
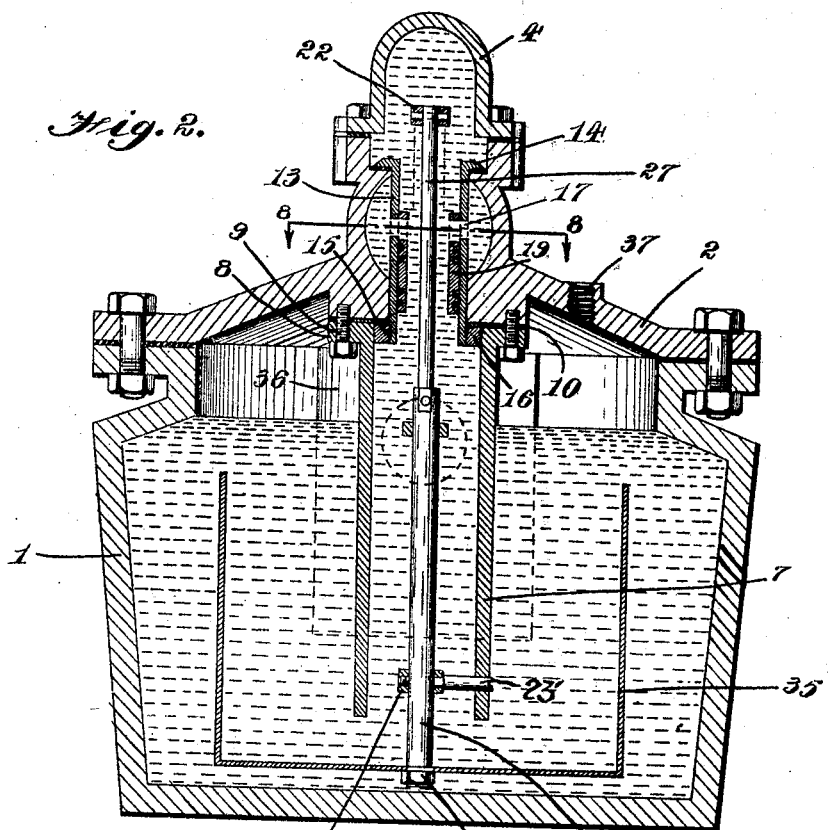
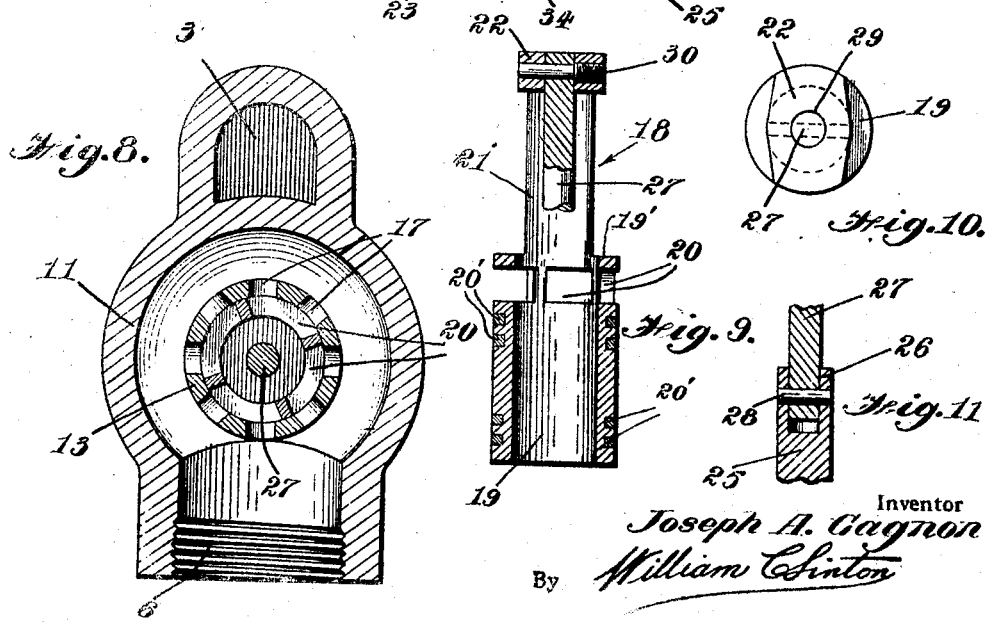
Inventor
Joseph A. Gagnon
By William Clinton
Attorney Patented Mar. 16, 1926.

1,576,648

UNITED STATES PATENT OFFICE.

JOSEPH A. GAGNON, OF THREE RIVERS, QUEBEC, CANADA.

STEAM TRAP.

Application filed June 18, 1923. Serial No. 646,211.

*To all whom it may concern:*

Be it known that I, JOSEPH A. GAGNON, a subject of the King of Great Britain, residing at Three Rivers, Province of Quebec, Canada, have invented certain new and useful Improvements in Steam Traps; and I do hereby declare that the following is a full, clear, and exact description of the invention, such as will enable others skilled in the art to which it appertains to make and use the same.

The present invention pertains to a novel steam trap, the principal object of which is to dispense with the necessity of adjustable weights which are used in traps of present construction.

The traps of the various types now in use are controlled by a valve which is opened or closed according to pressure conditions existing within the device. When the pressure is sufficiently great to lift the valve to open position, the untimely closing of the valve after a slight reduction in pressure due to discharge is avoided by counterweights connected to the valve member. These weights are also adjustable for the purpose of setting the valve to operate under the desired pressure conditions, depending on the desired frequency of discharge.

The present invention aims to overcome the necessity of weights of any character by introducing a valve which is balanced by the discharging fluid. The valve member controlling the outlet flow is in the nature of a slidable thimble, and is so arranged within the device as to be under the influence of equal pressures acting thereon in opposite directions during discharge. In this manner, the valve when once open for discharge is not closed by a slight reduction of pressure since it is balanced against movement while the other conditions within the trap are inducive to outflow. The interior of the trap contains a device operable on the float principle, which is actuated to close the valve when a definite quantity of fluid has been discharged. This device also moves to open the control valve when the trap has again received a definite volume of fluid. This device alone controls the movement of the valve, the latter being unaffected by variations in pressure between the limits within which the float device is stationary, due to the balancing of the valve by pressure acting equally at opposite ends thereof.

The invention is fully disclosed in the following description and in the accompanying drawings in which:

Figure 2 is a section on the line 2—2 of Figure 1;

Figure 8 is a section on the line 8—8 of Figure 2;

Figure 9 is a detail view of the balanced piston valve as shown in Figure 2;

Figure 10 is a plan view thereof; and,

Figure 11 is a section of the loose pin joint in the piston valve rod.

Reference will now be had to the accompanying drawings by means of like reference characters which are employed to designate corresponding parts throughout.

Figure 1:
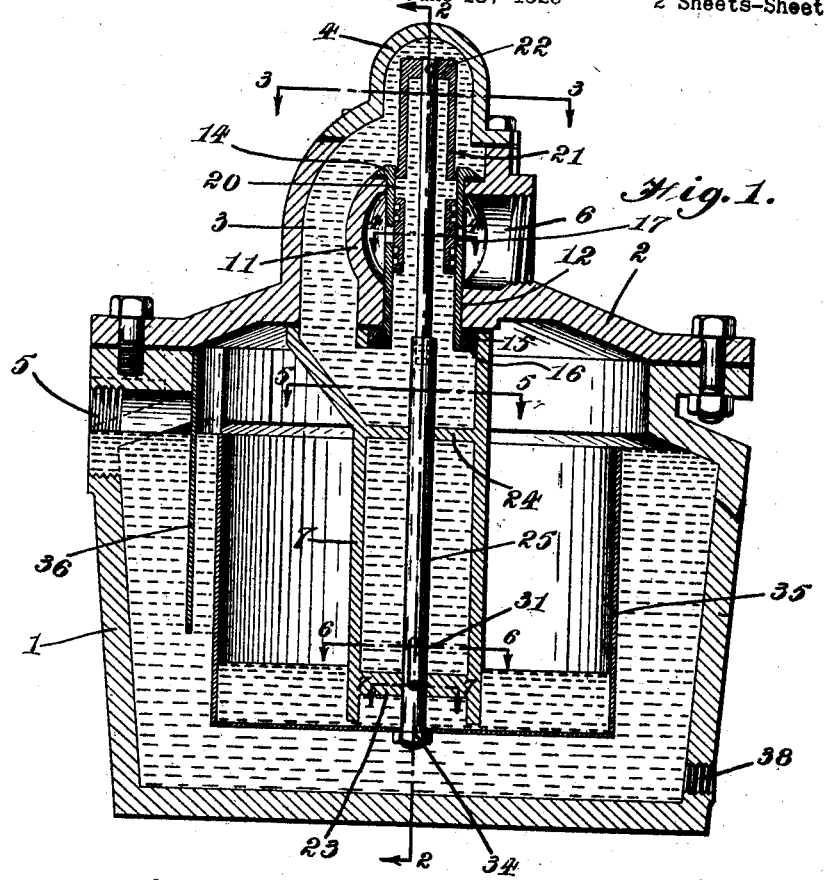
Figure 1 is a vertical section through the device, taken through the inlet and outlet.
Figure 5:
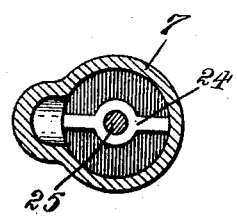
Figure 5 is a section on the line 5—5 of Figure 1.
Figure 4:
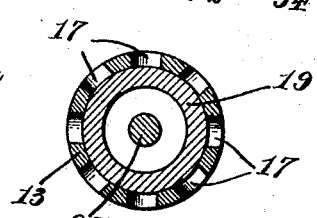
Figure 4 is a section on the line 4—4 of Figure 1.
Figure 3:
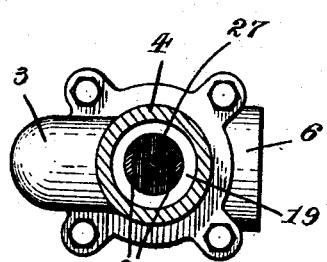
Figure 3 is a section on the line 3—3 of Figure 1.
Figure 6:
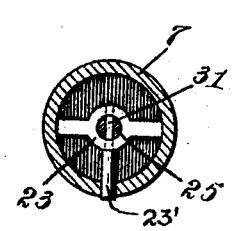
Figure 6 is a section on the line 6—6 of Figure 1.

The device as shown in Figures 1 and 2 comprises a main casing 1 fitted with a separable top 2. In the top is formed a by-pass chamber 3 open at its upper end and there provided with a removable cover 4, whereby access may be had to the working parts. The casing is formed near its upper edge with an inlet opening 5 which is adapted to receive a conducting pipe leading from a condenser or similar apparatus. The outlet tube 6 of the trap is formed as illustrated in Figure 1.

The lower end of the chamber by-pass 3 communicates with an outlet pipe 7 extending downwardly into the casing 1 and having an open lower end which is spaced from the bottom of the casing. The attachment may be made by forming a flange 8 at the upper end of the pipe and passing bolts 9 therethrough into the wall of the casing, suitable packing 10 being interposed. In this manner, the bottom of the casing is placed in direct and exclusive communication with the chamber.

The outlet tube 6 which is integral with the walls of the by-pass chamber 3 is formed with an enlarged closed inner end 11 having substantially the form of a sphere. Through this end is drilled a transverse passage 12 the axis of which is substantially in line with the axis of the outlet pipe 7. A sleeve 13 is inserted in the passage and is formed at its upper end with an exterior flange 14 which rests on the top of the tube 6. The lower end is threaded as at 15 into a nut 16 received in the upper end of the outlet pipe. The sleeve is formed with a series of ports 17 which communicate with the interior of the outlet tube.

A balanced piston valve member, indicated in general by the numeral 18 in Figure 9, is slidably mounted within the sleeve for controlling the ports 17. This member consists of a thimble 19 of sufficient length to cover the ports, and is formed near its upper end with a circular series of openings 20 adapted for registration with the ports 17, as shown in Figure 2. From the upper end of the thimble extends a pair of diametrically opposed arms 21 terminating at their upper ends in a connecting head 22. In the surface of the thimble are embedded a number of piston rings 20' to insure a tight fit and to compensate for the expansion of the metal. The number of rings provided depends on the pressure at which the apparatus is to be operated, and the rings may be dispensed with for low pressure work.

Figure 7:
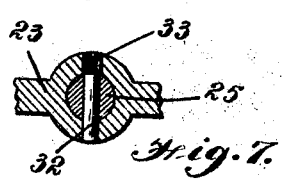
Figure 7 is a section on the line 7—7 of Figure 1.

The outlet pipe 7 is provided near its lower end with a bridge 23 and near its upper end with a guide 24. A pin 23' is preferably passed through the pipe 7 and into the bridge 23 to aid in supporting the latter. Through these two members is passed a piston valve rod 25 the upper end of which is bifurcated as at 26. Within the bifurcation is received an extension rod 27, the two parts being loosely connected by a pin 28 passed therethrough. The upper end of the extension rod is received in an aperture 29 formed in the head 22, and is held therein by a pin 30 disposed between the arms 21. The rod and its extension constitute a practically flexible member because of the two loose pin joints at 28 and 30 being perpendicular to each other. The lower end of the rod 25 is formed with a slot 31, and a pin 32 is passed through the bridge 23 and the slot, being threaded into the bridge as at 33 (Figure 7). A nut 34 at the lower extremity of the rod 25 supports a bucket 35 of considerable volume surrounding the outlet pipe 7 and normally spaced from the lower end thereof. The slot 31 is of such length as to allow the openings 20 to register with the ports 17 at the end of the downward stroke of the valve rod.

At the inlet 5 the casing contains a deflector 36 arranged between the bucket and the inner wall of the casing. This member serves to prevent a direct flow from the inlet to the bucket, causing the water to drop first as far as possible into the bottom of the casing.

The operation is as follows: Water from a condenser or similar apparatus enters the inlet 5 and occupies the space at the bottom of the casing beneath the bucket and the annular space around the bucket. The movable parts are of such weight that they are buoyed up by this water so that the piston valve closes the ports 17 as shown in Figure 1. Subsequently, the water rises and overflows the edge of the bucket and drops therein. When the weight of the water in the bucket is sufficient to overcome the buoyancy of the water surrounding it, the piston valve rod 25 and extension 27 are forced downwardly, carrying with them the piston valve. The openings 20 now register with the ports 17, establishing a free passage from the interior of the trap to the outlet tube 6. The pressure of the vapor in the device to which the trap is connected, acting on the surface of the water, forces the same upwardly through the outlet pipe 7 and tube 6 until the bucket and associated parts are again buoyed up to the position shown in Figure 1. The ports 17 are now closed and the cycle is repeated.

When the trap is discharging as in Figure 2, the upward pressure of the rising water cannot lift the piston valve to closed position. The by-pass chamber 3 becomes filled with water at the pressure of the discharge. This water passes between the arms 21 and exerts a pressure downwardly upon the extreme upper end 19' of the thimble. This downward pressure balances the upward pressure against the lower end of the thimble caused by the upward flow of the column within the outlet pipe 7. The valve is thus balanced until the bucket is emptied sufficiently to be again buoyed up. This device dispenses with the necessity of balancing the valve with adjustable weights, as is now the practice.

The cover 2 may be formed with an air vent 37, and the bottom of the casing 1 with a drip opening 38, if desired.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A steam trap comprising a casing having an inlet and an outlet tube, said tube having a passage therethrough, a by-pass communicating directly with both ends of the passage, means for preventing direct communication between said inlet and the by-pass, whereby said passage receives fluid in opposite directions when the trap is discharging, a valve member slidably disposed in said passage for controlling the tube, and a float device disposed in the casing and connected to the valve member.

2. A steam trap comprising a casing having an inlet and an outlet tube, said tube having a passage therethrough, a by-pass communicating directly with both ends of the passage, means for preventing direct communication between said inlet and the by-pass, whereby said passage receives fluid in opposite directions when the trap is discharging, a hollow valve member slidably disposed in said passage for controlling the tube, and a bucket disposed in the casing and connected to the valve member.

3. A steam trap comprising a casing having an inlet and an outlet tube, said tube having a passage therethrough, a valve member slidably disposed in said passage for controlling the tube, a bucket disposed in the casing and connected to the valve member, an outlet pipe establishing communication between the interior of the bucket and said passage, and a by-pass chamber extending from the upper end of the passage to the outlet pipe at a point below the passage.

4. A steam trap comprising a casing having an inlet and an outlet tube, said tube having a transverse passage therethrough, a by-pass communicating directly with both ends of the passage, means for preventing direct communication between said inlet and the by-pass, whereby said passage receives fluid in opposite directions when the trap is discharging, a sleeve secured in said passage and formed with ports in communication with the tube, a valve member slidably disposed in the sleeve for controlling said ports, and a float device disposed within the casing and connected to said valve member.

5. A steam trap comprising a casing having an inlet and an outlet tube, said tube having a transverse passage therethrough, a by-pass communicating directly with both ends of the passage, means for preventing direct communication between said inlet and the by-pass, whereby said passage receives fluid in opposite directions when the top is discharging, a sleeve secured in said passage and formed with ports in communication with the tube, a valve member slidably disposed in the sleeve for controlling said ports, and a bucket disposed within the casing and connected to said valve member.

6. A steam trap comprising a casing having an inlet and an outlet tube, said tube having a transverse passage therethrough, a sleeve secured in said passage and formed with ports in communication with the tube, a valve member slidably disposed in the sleeve for controlling said ports, a bucket disposed within the casing and connected to said valve member, an outlet pipe establishing communication between the interior of the bucket and said passage, and a by-pass chamber extending from the upper end of the passage to the outlet pipe at a point below the passage.

7. A steam trap comprising a casing having an inlet and an outlet tube, said tube having a transverse passage therethrough communicating independently at both ends with the interior of the casing, whereby said passage receives fluid in opposite directions when the top is discharging, a sleeve secured in said passage and formed with ports communicating with the outlet tube, a valve member slidably mounted in said sleeve for controlling the ports, said member comprising a thimble having openings adapted for registration with the ports, a pair of spaced arms extending upwardly from the top of said sleeve, and a float device disposed in the casing and connected to said arms.

8. A steam trap comprising a casing having a by-pass chamber in its top, an inlet, an outlet tube extending from and having its inner end formed integral with the walls of said chamber, a passage formed in the tube, a valve member slidably disposed in the passage for controlling the outlet tube, a bucket within the casing and connected to the valve member, an outlet pipe establishing communication between the bucket and the said passage, said by-pass chamber extending from the upper end of the passage to the outlet pipe at a point below the passage.

9. A steam trap comprising a casing having a by-pass chamber in its top, an inlet, an outlet tube having its inner end disposed adjacent and formed integral with the walls of said chamber, a transverse passage formed through the tube, a sleeve secured in the passage and having ports communicating with the outlet tube, a valve member slidably disposed in the sleeve for controlling said ports, a bucket disposed in the casing and connected to said valve member, an outlet pipe establishing communication between the bucket and said passage, said by-pass chamber extending from the upper end of the passage to the outlet pipe at a point below the passage.

10. A steam trap comprising a casing having a by-pass chamber in its top, an inlet, an outlet tube having its inner end disposed adjacent and formed integral with the walls of said chamber, a transverse passage formed through the tube and having both ends in communication with the by-pass chamber, whereby fluid enters both ends of the passage at equal pressures when the trap is discharging, a sleeve secured in the passage and having ports communicating with the outlet tube, a valve member slidably disposed in the sleeve, said member including a thimble formed with openings adapted for registration with the ports, a pair of spaced arms extending upwardly from said thimble, a bucket disposed in the casing and connected to said arms, and an outlet pipe extending from the interior of the bucket to the lower edge of the by-pass chamber.

In witness whereof I have hereunto set my hand.

JOSEPH A. GAGNON.